(12) United States Patent
Mayo et al.

(10) Patent No.: US 8,746,513 B2
(45) Date of Patent: Jun. 10, 2014

(54) SHAKER CAN

(75) Inventors: Roy G. Mayo, St. Charles, MO (US);
Thomas D. Kraatz, Glendale, MO (US);
W. Stewart Clark, Brentwood, MO (US)

(73) Assignee: Senoret Chemical Company, Lititz, PA (US)

( * ) Notice: Subject to any disclaimer, the term of this patent is extended or adjusted under 35 U.S.C. 154(b) by 11 days.

(21) Appl. No.: 13/559,203

(22) Filed: Jul. 26, 2012

(65) Prior Publication Data

US 2013/0020356 A1    Jan. 24, 2013

Related U.S. Application Data

(63) Continuation of application No. 12/434,455, filed on May 1, 2009.

(60) Provisional application No. 61/050,128, filed on May 2, 2008.

(51) Int. Cl.
*A47G 19/24* (2006.01)
*B31B 1/86* (2006.01)
*B65D 25/14* (2006.01)
*B65D 25/28* (2006.01)
*B65D 25/38* (2006.01)

(52) U.S. Cl.
USPC ........ 222/465.1; 222/565; 220/755; 220/768; 493/88

(58) Field of Classification Search
USPC ......... 222/189.02, 189.03, 457.5, 465.1, 467, 222/480, 565; 220/212.5, 755, 767–769; 493/88, 226; 229/4.5, 5.5, 5.81
See application file for complete search history.

(56) References Cited

U.S. PATENT DOCUMENTS

| | | | |
|---|---|---|---|
| 40,605 A | 11/1863 | Caldwell | |
| 686,669 A * | 11/1901 | Cope | 222/168 |
| 892,392 A | 7/1908 | Blood | |
| 934,283 A | 9/1909 | Case | |
| 1,542,430 A | 6/1925 | Wever | |
| 1,632,540 A | 6/1927 | Clarke | |
| 3,190,537 A * | 6/1965 | Meinecke et al. | 229/5.5 |
| 3,664,554 A | 5/1972 | Shiozawa | |
| 4,596,363 A | 6/1986 | Wellard | |
| 6,047,878 A | 4/2000 | Lowry | |
| 6,401,952 B1 | 6/2002 | Ming | |

* cited by examiner

*Primary Examiner* — Darren W Gorman
(74) *Attorney, Agent, or Firm* — Jacobson Holman, PLLC.

(57) ABSTRACT

A shaker dispenser for containing and dispensing product includes a body, a handle, and a dispensing mechanism. The handle includes a base portion and a handle gripping portion that a user may grip to transport and use the dispenser. The handle is inserted within the body such that the entire handle, including the handle gripping portion, is within the body, thereby allowing the shaker dispenser to sit, if desired, on the end having the handle. The body includes indentations, or cut-aways, that allow the handle to be visible from at least one of: a front view, a side view, and a back view. A method of manufacture and use of a shaker dispenser is also described.

14 Claims, 6 Drawing Sheets

önerus
SHAKER CAN

CROSS-REFERENCE TO RELATED APPLICATIONS

This is a continuation application of application Ser. No. 12/434,455 filed on May 1, 2009, which claimed priority from U.S. Prov. App. Ser. No. 61/050,128 filed May 2, 2008, the priority of which is hereby claimed.

FIELD OF THE DISCLOSURE

The present disclosure generally relates to a shaker dispenser that may store a material for dispersing or dispensing directly from the shaker dispenser.

BACKGROUND

Materials such as insecticides, fertilizers, weed killers, ice-melt, grass seed, spices, glitter, sprinkles for cookies, powdered sugar, carpet cleaners/fresheners, or any other suitable material that a user typically disperses, often require a separate dispenser, such that the product is purchased in a bag or can and then placed in a separate device to disperse the product in the desired manner. In other cases, some users may attempt to disperse product directly from a bag or can not designed for dispersion. In such cases, the user may inadequately disperse the product by, for example, dispersing the product unevenly. Transfer of some materials such as insecticides, fertilizers, weed killers, ice-melt, from packaging to a dispersion device may inadvertently lead to contact with the user's skin which may be undesirable depending upon the chemical composition of the material.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
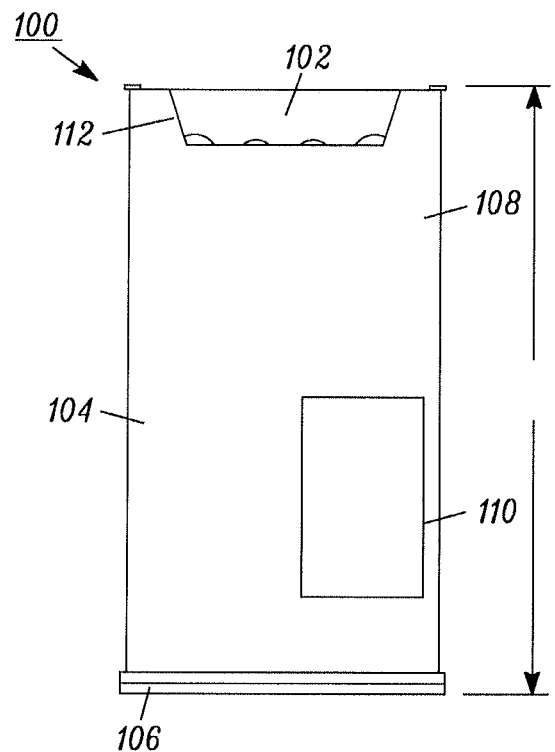
FIG. 1 is a front view of a shaker dispenser.

For the purposes of promoting and understanding the principles disclosed herein, references are now made to the preferred embodiments illustrated in the drawings and specific language is used to describe the same. It is nevertheless understood that no limitation of the scope of the invention is thereby intended. Such alterations and further modifications in the illustrated device and such further applications of the principles disclosed as illustrated herein are contemplated as would normally occur to one skilled in the art to which this disclosure relates. Furthermore, the drawings include some example dimensions, but these dimensions are for illustrative purposes in one example only and are not presented as a means of limitation in any way.

FIG. 1 shows a shaker dispenser (i.e., a canister) generally designated 100. Dispenser 100 may hold any suitable product, typically in a powder or granular form, that a user may wish to disperse. For example, dispenser 100 may hold insecticides, fertilizers, weed killers, ice-melt, grass seed, spices, glitter, sprinkles for cookies, powdered sugar, carpet cleaners/fresheners, or any other suitable material that a user typically disperses or applies. Many of these products often require a separate dispenser, such that the product is purchased in a bag or can and then placed in a separate device to disperse the product in the desired manner. In other cases, some users may attempt to disperse product directly from a bag or can not designed for dispersion. In such cases, the user may inadequately disperse the product by, for example, dispersing the product unevenly.

Shaker dispenser 100, however, is designed with features, some examples of which are described below, that enable a user to efficiently and effectively utilize the contents of shaker dispenser 100 without requiring the use of a separate device. Shaker dispenser 100 includes, for example, handle 102, body 104, and a cap 106. Body 104 of shaker dispenser 100 shown in the figures is in the form of a cylinder, but it is understood that the body 104 may take the form of any suitable shape. Similarly, because body 104 is a cylinder, other disclosed features, such as cap 106, are rounded to appropriately interact with body 104, but it is understood that the other features of dispenser 100 may be of any suitable shape to appropriately interact with the other features of dispenser 100.

Body 104, or any other suitable portion of dispenser 100, may include advertising indicia 108, which may be printed directly onto body 104 or may be included on a label 110, which is applied to body 104 of dispenser 100 by any suitable means. The label 110 may be made of paper, plastic, or any suitable material. In one example, the label 110 may be applied to body 104 with an adhesive. In another example, label 110 may wrap around body 104 and adhesively connected at each end of itself to secure label 110 around body 104. Although not shown, advertising indicia may also be attached to handle 102 or cap 106. The advertising indicia may include any text or graphics to describe the product, the dispenser, the price, the use of the product, or any additional information to convey to a potential purchaser or user of the product.

Figure 2:
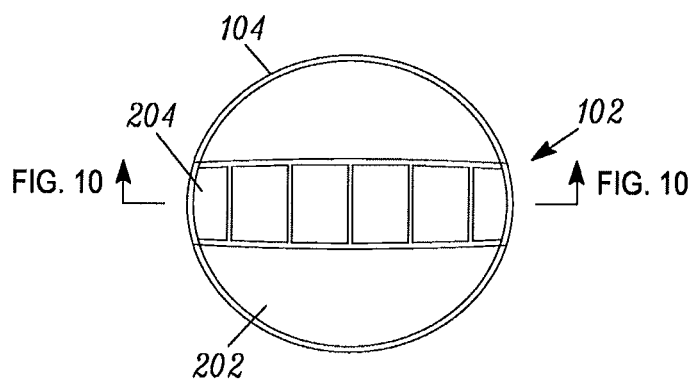
FIG. 2 is a top view of the shaker dispenser shown in FIG. 1.
Figure 3:
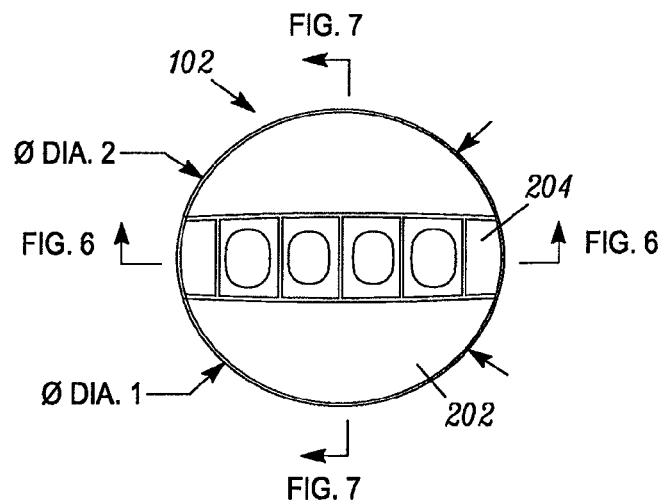
FIG. 3 is a top view of a handle associated with the dispenser shown in FIG. 1.

FIG. 2 shows a top view of dispenser 100, which also shows a top view of handle 102. Handle 102 includes a handle base 202 and a handle gripping portion 204. FIGS. 3-9 show handle 102 in greater detail. As best seen in the front view of handle 102 in FIG. 5, handle gripping portion 204 is attached to handle base by handle support members 502, 504. Handle support members 502, 504 may include ribs 506, which may include lands 508 and grooves 510. The handle 102 may be one piece formed, for example, by an injection molding process. In one example, the handle is made from polystyrene. Although the handle shown is molded as one piece, other embodiments may be produced from two or more parts to form the same structure. Such parts may be assembled, for example, by snapping or sonic welding. The handle 102 may include threads in some embodiments, for threading into the dispenser body. In such embodiments, the dispenser body may be formed from metal or plastic, such as, but not limited to, injection molded plastic.

The handle base 202 may include a top base portion 512 and a bottom base portion 514 joined at 511. Top and bottom base portions 512, 514 may form a flat surface. Alternatively, top and bottom base portions 512, 514 may be angled to form an apex, or at least bottom base portion 514 may be angled with respect to top base portion 512. As one skilled in the art will appreciate, this configuration of the top and bottom base portions 512, 514 may allow the handle 102 to more easily be inserted into the body 104 of dispenser 100. The outer surface 518 of handle base 202 may be glued to an inner portion of body 104. As such, the bottom surface 517 of handle 102 may prevent product from exiting the end of the body 104.

Alternatively, a separate means may be used to prevent product from undesirably leaving the dispenser 100, and handle 102 may not have a handle base 202, i.e., a handle gripping portion 204 alone may be mounted within body 104. In another example where a separate means prevents product from undesirably leaving dispenser 100, the handle base 202 may still be present but may not have a diameter to fully fill the diameter of body 104. The separate means for preventing product from undesirably leaving the dispenser 100 may include, for example, a panel mounted within body 104, a bag within body 104, or any other suitable element to adequately enclose the top portion 1002 (described below) of body 104.

Figure 5:
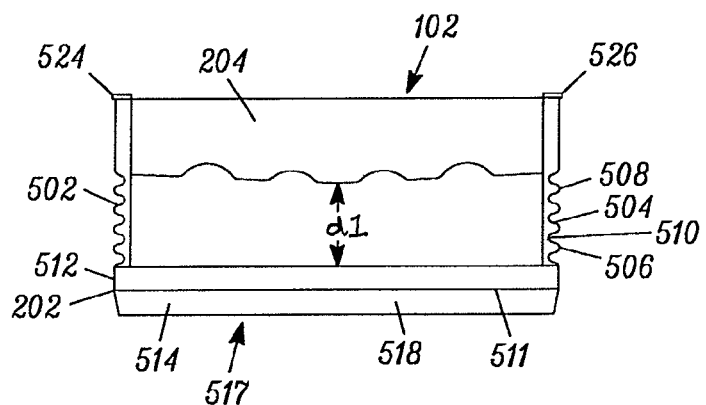
FIG. 5 is a front view of the handle of FIG. 3.
Figure 6:
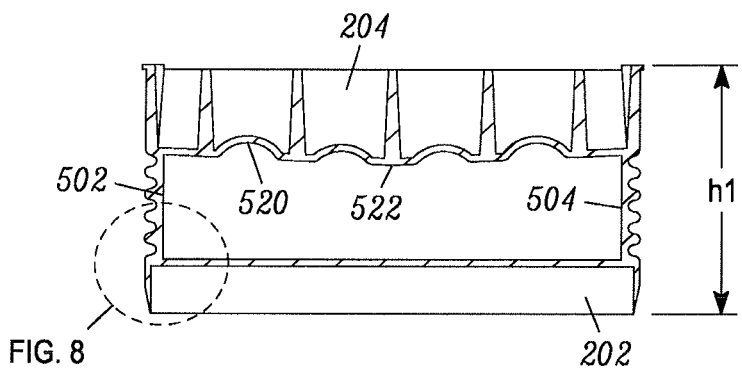
FIG. 6 is a cross-sectional view of the handle.
Figure 7:
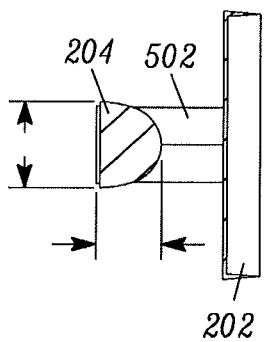
FIG. 7 is a cross-sectional view of the handle.
Figure 8:
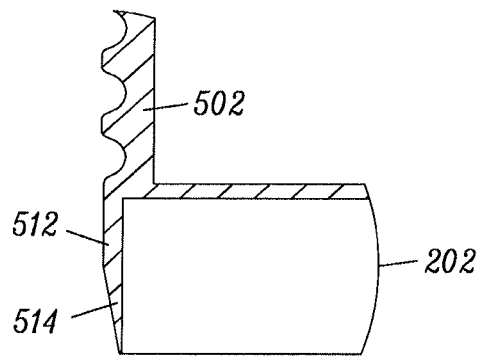
FIG. 8 is an enlarged view of the detail identified in FIG. 6.

The handle gripping portion 204 may take any suitable form and may include any desirable characteristics for a handle. For example, as best seen in FIG. 7, handle gripping portion 204 includes a convex surface, which may be desirable for a user using handle 102 to carry dispenser 100. For similar reasons, among others, handle gripping portion 204 may include padding, non-slip attributes (e.g., textured surface, applied material with a texture), or other characteristics conducive for carrying dispenser 100. For example, as best shown in FIGS. 5 and 6, handle gripping portion 204 includes grooves 520 and lands 522. When a user is carrying dispenser 100, the user's fingers may cooperate with grooves 520 for added comfort.

Figure 4:
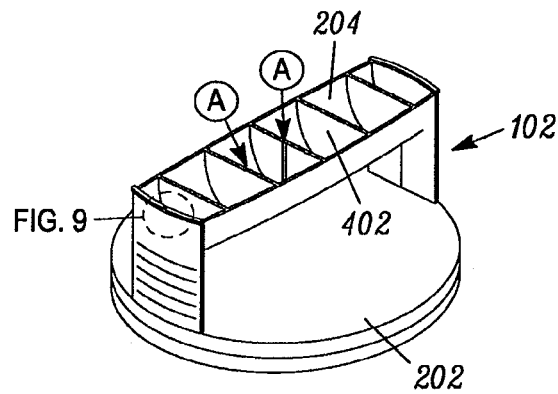
FIG. 4 is a side perspective view of the handle of FIG. 3.

In one example, as best seen in FIG. 4, the handle gripping portion 204 is formed in a u-shape with cross supports 402 for added strength. Handle gripping portion 204, however, may take any suitable form.

Figure 10:
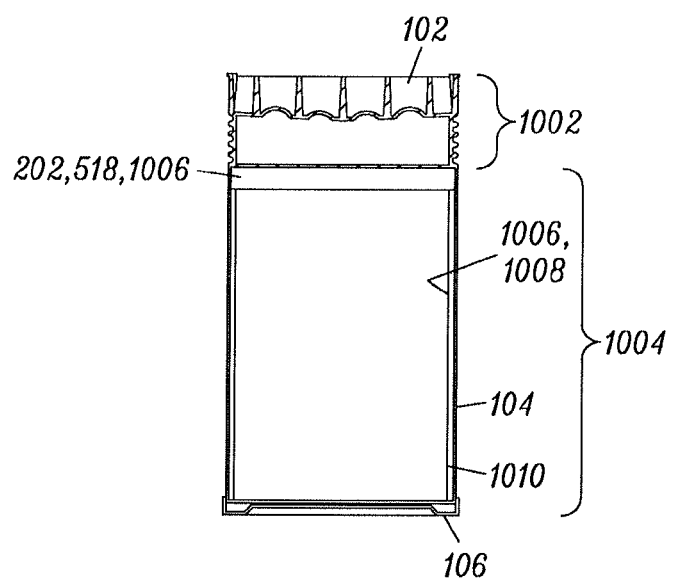
FIG. 10 is a cross-sectional view of the dispenser shown in FIG. 2.

Turning now to FIG. 10, a cross sectional view of dispenser 100 is shown, taken from FIG. 2. For the sake of explanation, body 104 has a top portion 1002 and a bottom portion 1004. The designation of "top" and "bottom," however, has no significance with respect to orientation of the dispenser 100, and alternatively, the top and bottom portions could be designated by any other suitable labels, such as a first end portion and a second end portion.

As shown, handle 102 is inset within the top portion 1002 of body 104 and the outer surface 518 of handle base 202 is glued to an inner surface 1008 of the wall 1006 of body 104.

Body 104 may be formed from any suitable material, but in one embodiment, body 104 is formed from a paper tube, i.e., a fibre canister. Depending on factors such as the product within the canister, the body 104 may be lined with a lining material 1010 to further contain the product and any chemicals associated therewith. For example, some products may contain a chemical residue that could seep through a body 104 made of paper. To help prevent such seepage, lining material 1010 may be placed within the interior of body 104 along the inner surface 1008 of body 104. Lining material 1010 may be made from metal (e.g., foil), paper, chemical treated material, plastic, rubber, or any other suitable material. Lining material may be inserted within the body as a sheet, or it may be applied to inner surface 1008 as a coating.

Figure 11:
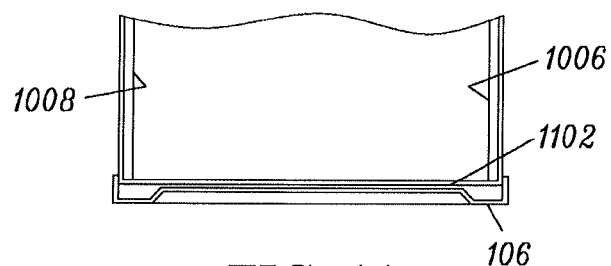
FIG. 11 is a more detailed cross-sectional view of the bottom of the dispenser of FIG. 1.

Turning now to FIG. 11, the bottom portion 1004 of body 104 is shown in greater detail, along with other features of dispenser 100. At the bottom of dispenser 100, a dispersing mechanism 1102 is attached. In one example, the dispersing mechanism may be a crimped metal bottom with crimps 1104 about the outer circumference of the dispersing mechanism 1102 to hold the dispersing mechanism 1102 to the body 104 of dispenser 100. Any suitable means for securing the dispersing mechanism 1102 to body 104 may be used, however, such as, for example, glue. Some embodiments may employ threads when the body 104 is manufactured from plastic or metal. Also, dispersing mechanism 1102 is shown to wrap around the outer surface 1106 of body 104. It is understood, however, that dispersing mechanism may be inset within the body 104, for example, such that the outer circumference of the dispersing mechanism 1102 is adjacent to the inner wall 1006 of the body 104.

Figure 12:
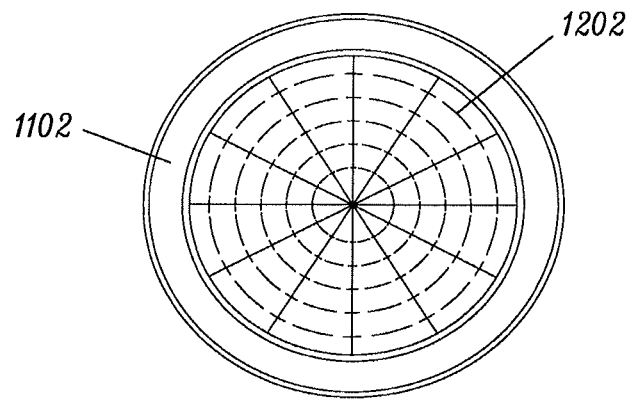
FIG. 12 is a bottom view of the dispenser of FIG. 1.
Figure 13:
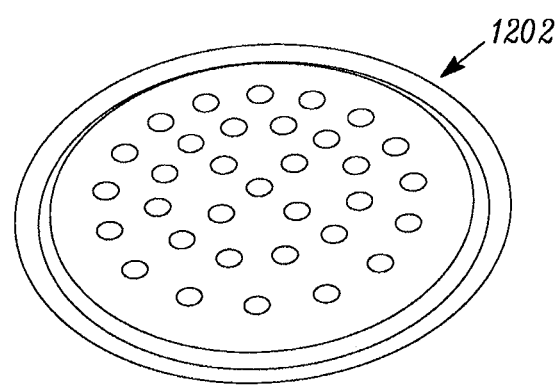
FIG. 13 is a perspective view of the bottom of a shaker dispenser with both the cap and protective panel removed, thereby showing perforations (i.e., holes in this case) through which product may be dispensed.
Figure 14:
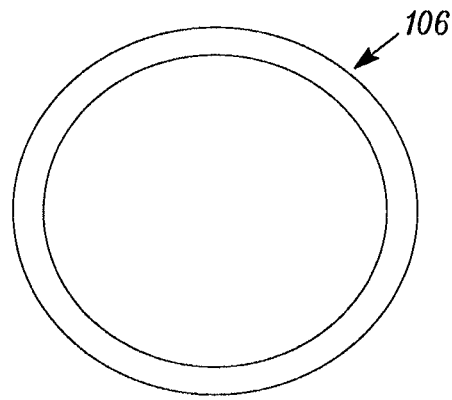
FIG. 14 is a bottom view of a shaker dispenser with the cap in place.
Figure 15:
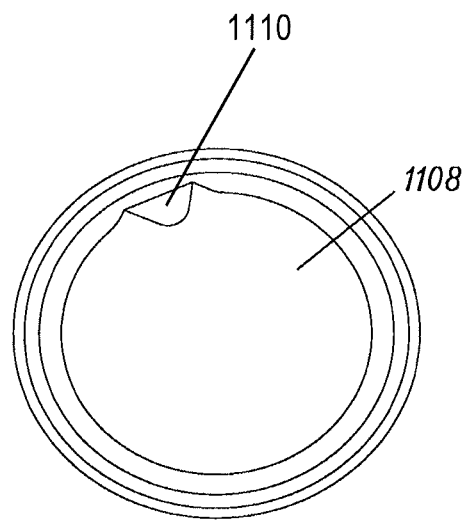
FIG. 15 is a bottom view of a shaker dispenser with the cap removed, thereby showing the dispensing mechanism with a protective panel (and associated pull tab) attached thereto.

As shown in FIG. 12, the dispersing mechanism 1102 includes perforations 1202 through which product within dispenser 100 may pass. The perforations may take any suitable form such as slots or holes. The perforations 1202 may vary in shape and/or dimensions depending on the characteristics of the product within dispenser 100, including, for example, the granularity of the product and the desired rate of application of the product.

Turning back to FIG. 11, a protective panel 1108 is overlaid and, in one example, sealed to dispersing mechanism 1102. Protective panel 1108, among other things, maintains the freshness and quality of the product within dispenser 100. Thus, for example, the protective panel 1108 may form an airtight seal to prolong the longevity of the product and to prevent moisture or other substances from entering the dispenser 100, which may adversely affect the product.

Furthermore, the protective panel 1108 may have tamper evident characteristics that may indicate if the product has potentially been tampered with. In one example, the protective panel 1108 is a foil "laminate" that is heat sealed to the dispersing mechanism 1102, but it is understood that the protective panel 1108 may be sealed to the dispersing mechanism 1102 by any suitable means, such as, for example, an adhesive. To assist a user in removing the protective panel 1108, protective panel 1108 also includes pull tab 1110. Pull tab 1110 may be a metal foil tab, for example.

Briefly, one method of manufacturing dispenser 100 includes starting with a paper tube, which forms body 104. The paper tube may be cut from a longer tube. A label 110 may be applied to the paper tube before cutting the tube into separate body portions 104 or may be applied to the paper tube when cut to the desired length. In one example, as best shown in FIG. 1, portions of body 104 may be cut away to form indentation 112, which may allow the end of body 104 to be level with the handle gripping portion 204 when the handle 204 is inserted into body 104.

Indentations 112 include any cut-away material from body 104 that forms a recess in the first end or top of the body. It is preferred to place handle 102 far enough within the body 104 such that the end of the tube with the recess containing the handle 102 may sit level on the ground. In other words, the distance d1 shown in FIG. 5 (i.e., the distance from the top end of body 104 to the portion of body 104 at which handle base 202 is glued to the inner surface 1008) is greater than or equal to the height h1 of handle 102 shown in FIG. 6. Among other things, this allows a user to sit the container in a vertical "upside-down" orientation ("upside-down" is used relatively) to fill dispenser 100 or to more easily remove cap 106 or protective panel 1108. Additionally, if a user desires to rest and cease dispensing product, the user may place dispenser 100 with the handle towards the ground so that undesired dispersion does not occur.

As yet another advantage of insetting the handle 102 entirely within the body 104, multiple dispensers 100 can more easily be boxed, stacked, and stored, as one skilled in the art will appreciate. In placing the handle entirely within body 104, however, a user may not see handle, for example, if dispenser 100 is sitting on a shelf in a store. Since the handle 102 is a useful feature of dispenser 100, it is desired that a potential customer can easily see handle 102 if dispenser 100 is sitting on a shelf. With indentations 112, however, a potential customer will be able to see handle 102 when dispenser 100 is sitting on a shelf.

In one embodiment, the handle 102 may be substantially within the body 104 but a small portion of the handle 102 may protrude beyond the body 104. In one such example, the very top of each end of the handle gripping means may have slight projections 524 and 526. These projections 524, 526 cause the handle 102, at the very top portion, to be slightly wider than the inner diameter of the body 104. As such, the handle will not completely go within the body 104. Thus, the projections 524, 526 allow easier assembly by not allowing the handle 102 to be inset too far within body 104.

Figure 9:
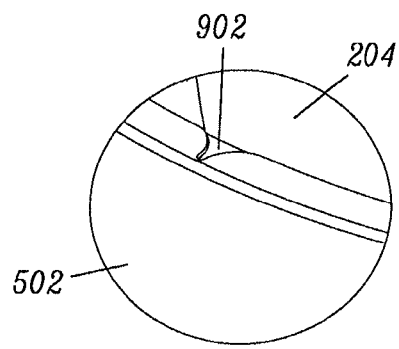
FIG. 9 is a magnified view of a portion of the handle shown in FIG. 4.

Next, glue is applied to the inner surface 1008 of body 104. The handle 102 is then inserted into the body 104. When done manually, label 110 may include some indicia (not shown) that indicates how the handle 102 should be rotationally oriented within the body 104. The indicia may be, for example, a dot or line printed on the label 110 or may be a seam on the label 110. As shown in FIG. 9, handle 102 may include a notch 902. Thus, if a person is manually assembling the dispenser 100 or if a device with notch and indicia detecting features is assembling dispenser 100, then an alignment of notch 902 with the indicia may allow the handle to be properly oriented with respect to, for example, the advertising indicia 108 on label 110 or indentation(s) 112.

The body 104 with handle 102 inserted therein may then be inverted such that the top portion 1002 is sitting on a surface. As one skilled in the art will appreciate, placing the handle griping portion 204 within the body portion 104 allows the dispenser 100 to sit on either its top end or its bottom end. The dispenser may then be filled with product, as desired. The dispersing mechanism 1102 is then attached (e.g., seamed) onto the inverted dispenser. The protective panel 1108 is sealed to the dispersing mechanism 1102 before the dispersing mechanism 1102 is attached to the body 104, although it is contemplated that the protective panel 1108 may be sealed to the dispersing mechanism 1102 after the dispersing mechanism 1102 is attached to body 104. Finally, cap 106 (e.g., a snap cap) is placed over the dispersing mechanism 1102.

To use the product within dispenser 100, a user removes cap 106. The user then removes the protective panel 1108 by pulling pull tab 1110, if one is on the dispersing mechanism 1102, and dispenses the product. To dispense the product, the user may hold handle 102 (which may also be used to carry dispenser 100 when not dispensing product) and may shake dispenser 100 to dispense as desired. As one skilled in the art will recognize, the user may shake with various amounts of vigor and/or carry the dispenser 100 at varying paces depending on the desired rate of dispersion of the product within dispenser 100. When done dispensing product, the user may place cap 106 back onto dispenser 100. Thus, if there is product remaining in dispenser 100, cap 106 may help preserve the freshness of the product. Additionally, cap 106 retains remaining product if the user carries dispenser 100 by handle 102, thereby preventing undesired dispersion of product.

It is understood that the preceding is merely a detailed description of some examples and embodiments of the present design and that numerous changes to the disclosed embodiments can be made in accordance with the disclosure made herein without departing from the spirit or scope of the disclosure. The preceding description, therefore, is not meant to limit the scope of the disclosure but to provide sufficient disclosure to one of ordinary skill in the art to practice the disclosure without undue burden.

What is claimed is:

1. A shaker dispenser for dispensing material comprising:
a shaker dispenser body having a cutout portion forming a recess on a first end of said shaker dispenser body to accommodate a handle grip, said shaker dispenser body being tubular and said recess in said first end having an inner diameter;
a handle having a base and a grip, said base having an outer diameter allowing insertion of said handle base into said recess of said shaker dispenser body having said inner diameter, said base being inserted into said recess and coupled to said first end of said shaker dispenser body, a bottom surface of said grip being vertically spaced from a base surface of said recess to form a spacing for allowing a user's fingers to pass through said spacing such that the user may grip the grip to carry said shaker dispenser body;
said handle further having two support members, each connected at a first end to said grip so as to be substantially perpendicular thereto, the two support members each being connected at a second end to said handle base, said two support members having an outside surface which contacts an inside surface of said shaker dispenser body when said handle is inserted within said shaker dispenser body, each of said outside surfaces having a plurality of grooves; and
a dispensing mechanism connected to a second end of the shaker dispenser body.

2. The shaker dispenser of claim 1, wherein a top surface of said grip aligns with an upper edge of said shaker dispenser body.

3. The shaker dispenser of claim 1, wherein said grip has an end-to-end grip length substantially equal to an outer diameter of said handle base.

4. The shaker dispenser of claim 1, wherein said shaker dispenser body is a paper material, and said shaker dispenser body further comprises:
a lining material applied to an inside surface of said dispenser body as a sheet or a coating, said lining material suitable for preventing seepage of residue through said paper material from a material to be stored in said shaker dispenser.

5. The shaker dispenser of claim 4, wherein said lining material includes at least one of a metal foil, a second paper material different from said paper material forming said shaker dispenser body, plastic, or rubber.

6. The shaker dispenser of claim 5, wherein said lining material is chemically treated material.

7. A method of manufacturing a shaker dispenser, the method comprising:
   forming a shaker dispenser body having a cutout portion forming a recess on a first end of said shaker dispenser body to accommodate a handle grip, said recess being encircled by an upper edge of said shaker dispenser body first end;
   installing a handle having a base portion and a grip portion by threading said handle into said shaker dispenser body, said base portion being received within said recess in the first end of the shaker dispenser body, a bottom surface of said grip portion being vertically spaced from a base surface of said recess to form a spacing for allowing a user's fingers to pass through said spacing such that the user may grip the handle to carry said shaker dispenser body, an upper surface of said grip portion being aligned with said upper edge of said first end of said shaker dispenser body and said handle being substantially contained within said shaker dispenser body; and
   connecting a dispensing mechanism to a second end of the shaker dispenser body.

8. The method of claim 7, further comprising:
   forming said shaker dispenser body with a first paper material;
   lining said shaker dispenser body with a lining material on an inside surface of said shaker dispenser body; said lining including at least one of a metal foil, a second paper material different from said first paper material forming said shaker dispenser body, plastic, or rubber.

9. The method of claim 8, wherein said step of lining includes applying said lining material as either a sheet form material or as a coating.

10. A shaker dispenser for dispensing material comprising:
    a shaker dispenser body having a cutout portion on a first end of said shaker dispenser body to accommodate a handle grip positioned within the shaker dispenser body;
    a handle having a base and grip, said handle base being inserted into the cutout portion at said first end of said shaker dispenser body and coupled to said first end, a top surface of said grip aligning with an upper edge of said shaker dispenser body, said handle further including two support members, each support member having a first end connected to one end of said grip, said grip having an end-to-end grip length substantially equal to an outer dimension of said handle base; and
    a dispensing mechanism connected to a second end of the shaker dispenser body.

11. The shaker dispenser of claim 10, wherein a second end of each of said two support members is connected to said handle base and is substantially perpendicular to said grip.

12. A shaker dispenser for dispensing material comprising:
    a shaker dispenser body having a recess with a surface positioned below an upper edge of said dispenser body on a first end of said shaker dispenser body;
    a handle having a grip and two support members, said support members having a ribbed outer surface, said handle coupled to said first end of said shaker dispenser body and said ribbed outer surface of said support members threadedly fitted within said recess, each support member having a top end and a bottom end, each top end being connected to said grip and each bottom end being connected to said dispenser body, said grip being spaced from said recess surface to form a spacing for allowing a user's fingers to pass through such spacing such that the user may grip the grip to carry said shaker dispenser body; and
    a dispensing mechanism connected to a second end of the shaker dispenser body.

13. The shaker dispenser as set forth in claim 12, wherein said recess is encircled by said upper edge of said shaker dispenser body, a top surface of said grip aligning with said upper edge of said shaker dispenser body so that said handle is contained within said shaker dispenser body.

14. the shaker dispenser as set forth in claim 12, wherein said grip has an end-to-end grip length substantially equal to an inner diameter of said recess.

* * * * *